United States Patent
Belmer et al.

(10) Patent No.: US 9,534,661 B2
(45) Date of Patent: Jan. 3, 2017

(54) ARTICULATED CHAIN WITH LOW-FRICTION LINK PLATE BACK

(71) Applicant: iwis motorsysteme GmbH & Co. KG, Munich (DE)

(72) Inventors: Stefan Belmer, Anzing (DE); Rolf Molter, Oberhaching (DE)

(73) Assignee: IWIS MOTORSYSTEME GMBH & CO. KG, München (DE)

( * ) Notice: Subject to any disclaimer, the term of this patent is extended or adjusted under 35 U.S.C. 154(b) by 249 days.

(21) Appl. No.: 14/323,810

(22) Filed: Jul. 3, 2014

(65) Prior Publication Data

US 2015/0018147 A1 Jan. 15, 2015

(30) Foreign Application Priority Data

Jul. 9, 2013 (EP) .................................. 13003469

(51) Int. Cl.

| | |
|---|---|
| *F16G 13/06* | (2006.01) |
| *F16H 7/08* | (2006.01) |
| *F16G 13/04* | (2006.01) |
| *F16G 13/08* | (2006.01) |

(52) U.S. Cl.
CPC .............. *F16G 13/06* (2013.01); *F16G 13/04* (2013.01); *F16G 13/08* (2013.01); *F16H 7/08* (2013.01)

(58) Field of Classification Search
CPC .......... F16G 13/04; F16G 13/06; F16G 13/08; F16H 7/08
USPC ................................................ 474/205–226
See application file for complete search history.

(56) References Cited

U.S. PATENT DOCUMENTS

| | | |
|---|---|---|
| 2,182,443 A | 12/1939 | McAninch |
| 4,650,445 A | 3/1987 | Mott |
| 4,704,098 A * | 11/1987 | Tsubakimoto .......... F16G 13/02 474/206 |
| 5,154,674 A | 10/1992 | Avramidis et al. |

(Continued)

FOREIGN PATENT DOCUMENTS

| | | |
|---|---|---|
| CN | 1 379 195 A | 11/2002 |
| CN | 2 703 920 Y | 6/2005 |

(Continued)

OTHER PUBLICATIONS

Office Action in Chinese Patent Application No. 201410445566.5, dated Nov. 4, 2015.

(Continued)

*Primary Examiner* — William E Dondero
*Assistant Examiner* — Robert T Reese
(74) *Attorney, Agent, or Firm* — Baker & Hostetler LLP

(57) ABSTRACT

An articulated chain having alternating inner and outer chain links connected by hinge, having a running direction, each inner link comprising a link plate and each outer link comprising two link plates and two hinge pins interconnecting, each hinge pin rotationally fixed in an opening of the associated outer link plates and extending through an opening of the associated inner link to form a chain hinge, the links having plate backs for contact with a tensioning or guide rail. The link plate back comprises a leading area viewed in the running direction and an adjoining trailing area, the leading area extending substantially parallel to a plane projected between center lines of pin openings and hinge openings, respectively, and the trailing area extending from a part of the link plates at an angle to the plane projected between the center lines, the vertex of the angle pointing in the running direction.

11 Claims, 7 Drawing Sheets

(56) References Cited

U.S. PATENT DOCUMENTS

| | | |
|---|---|---|
| 6,220,981 B1 | 4/2001 | Yoshida |
| 7,963,872 B2 | 6/2011 | Tohara et al. |
| 8,469,845 B2 | 6/2013 | Miyazawa et al. |
| 8,708,850 B2 | 4/2014 | Tohara |
| 2007/0082776 A1 | 4/2007 | Nagao |
| 2008/0287239 A1 | 11/2008 | Korse |
| 2009/0017951 A1* | 1/2009 | Tohara .................. F16G 13/08 474/231 |
| 2010/0222170 A1 | 9/2010 | Yasuta et al. |
| 2010/0267504 A1* | 10/2010 | Miyazawa .............. F16G 13/02 474/140 |
| 2011/0263369 A1 | 10/2011 | Kurihara |

FOREIGN PATENT DOCUMENTS

| | | |
|---|---|---|
| CN | 101344138 A | 1/2009 |
| DE | 41 13 370 A1 | 10/1991 |
| DE | 19907865 A1 | 9/1999 |
| DE | 102008033900 A1 | 2/2009 |
| DE | 102008004595 A1 | 7/2009 |
| DE | 102010007519 A1 | 9/2010 |
| DE | 102010013572 A1 | 10/2010 |
| DE | 102009052211 A1 | 5/2011 |
| DE | 102011009298 A1 | 7/2011 |
| EP | 1645778 A2 | 4/2006 |
| EP | 1878944 A2 | 1/2008 |
| GB | 2431216 A | 4/2007 |
| JP | H06-207643 A | 7/1994 |

* cited by examiner

ARTICULATED CHAIN WITH LOW-FRICTION LINK PLATE BACK

CROSS-REFERENCE TO RELATED APPLICATION

This application claims priority to foreign European Patent Application EP 13003469.7, filed on Jul. 9, 2013, the disclosure of which is incorporated herein by reference in its entirety.

FIELD OF THE INVENTION

The present invention relates to an articulated chain having alternating inner chain links and outer chain links connected to one another by means of a chain hinge, and having a running direction, each inner chain link comprising at least one inner link plate and each outer chain link comprising at least two outer link plates and two chain hinge pins interconnecting the same, each chain hinge pin being arranged in a rotationally fixed manner in a pin opening of the associated outer link plates and extending through a hinge opening of the associated inner chain link so as to form a chain hinge, and the inner and/or outer chain links having link plate backs that are adapted to be brought into contact with a tensioning and/or guide rail.

BACKGROUND

Articulated drive chains are frequently used in the automotive sector as timing chains in internal combustion engines and they couple the crankshaft to the at least one camshaft. Such timing drives include a guide rail in the taut span and a tensioning rail, to which pressure can be applied by means of a chain tensioner, in the slack span. When the articulated chain comes into contact with the tensioning and guide rails, friction is generated, which, in turn, leads to power losses and consequently to $CO_2$ emission from the internal combustion engine. Reducing the friction between the rails and the chain by means of an inwardly curved shape of the link plate back is a known measure in the field of technology.

A chain of this type is known e.g. from document DE 199 07 865 A1. The chain link plates used in this chain have link plate backs comprising two spaced-apart contact portions between which an oil holding space is formed. The area of contact with the tensioning and/or guide rail is reduced in this way. Simultaneously, a lubricating-oil cushion is intended to form between the two contact portions due to the recessed shape of the link plate back.

A similar structural design is known from U.S. Pat. No. 7,963,872 B2. Also these link plates comprise two spaced-apart contact portions between which a lubricant-optimizing recessed contour is provided.

In addition, document DE 10 2010 013 572 A1 discloses an articulated chain, in which the chain link plates have convex link plate backs for providing sliding contact with the tensioning and guide rails of a chain drive, the convex link plate backs being asymmetric in shape. When the chain link plates come into contact with the tensioning or guide rail, the asymmetric shape of the link plate back allows swinging in the direction of the running direction and of the rail so as to reduce the sliding contact resistance.

SUMMARY OF THE INVENTION

It is therefore the object of the present invention to provide an articulated chain of the type mentioned at the start, which provides improved reduction of the friction occurring between the chain and a tensioning and/or guide rail.

In the case of an articulated chain of the type in question, the present invention achieves this object in that the link plate back comprises a leading area viewed in the running direction and an adjoining trailing area, the trailing area of the link plate backs extending from at least a part of the inner and/or outer link plates at an angle to a plane projected between the center lines of the pin openings and hinge openings, respectively, and the vertex of the angle pointing in the running direction L, whereas the leading area of the link plate backs extends substantially parallel to the plane projected between the center lines. In this way, a sort of funnel is formed, in which the oil forced through between the guide and/or tensioning rail and the leading area of the chain is stirred up due to the detachment of the link plate back thus forming a lubricating cushion, which provides improved lubrication at least in the leading area (viewed in the running direction) of the subsequent link plate thus allowing the friction to be reduced by up to 8%. Link plates typically have a rounding on their end faces. These roundings are, however, not part of the link plate back. In this context, the link plate back is understood to mean only the straight link plate sections that extend substantially between the two center lines of the pin opening and of the hinge opening up to the roundings. However, this also means that the link-plate trailing area in the running direction is recessed such that it essentially does not come into contact with the tensioning and/or guide rail. In contrast thereto, documents DE 199 07 865 A1 and U.S. Pat. No. 7,963,872 B2 each provide a contact region in the leading area and also in the respective trailing areas. Depending on the traction force of the chain, the convex link plate back according to document DE 10 2010 013 572 A is in contact with the tensioning and/or guide rail in the trailing part of the link plate back. The structural design according to the present invention can be used with bush-type chains, roller chains, or tooth chains.

According to an advantageous embodiment, the trailing area of the link plate backs, which extends at an angle, may extend over a distance determined in the running direction, said distance corresponding to 50% to 90% of the pitch of the center lines of the pin openings and the hinge openings, respectively. In addition to providing the funnel defined by the inclined trailing area of the link plate back with a sufficient opening width so as to allow a reliable detachment of the oil film, an adequate width of the leading area of at least 10% of the pitch will cause the oil film to be sufficiently compressed to allow the oil film to be stirred when it gets detached in the funnel, whereby the chain will be able to slide more easily. Furthermore, the area of contact between the leading parallel area of the link plate backs, which extends substantially parallel to the plane projected between the center lines, and the tensioning and/or guide rails is reduced in comparison with conventional link plates, whereby the area subject to friction is reduced. Even if a dependence on the contact area plays no role in the theoretical determination of the friction force, there seem to be additional effects in practice which allow the friction to be reduced by reducing the friction surface. Less friction means less power loss, which, when the articulated chain according to the present invention is used in an internal combustion engine, leads to a reduction of the $CO_2$ emission.

The trailing area of the link plate backs, which extends at an angle, may preferably extend over almost the entire pitch of the center lines of the pin openings and hinge openings, respectively. This means that essentially the whole link plate back extends obliquely at the given angle. This kind of link plate is therefore in contact with the rail in question only in the very small area of the link plate back constituting the leading area when viewed in the running direction. It can, however, be expected that, due to increased stirring, a thicker oil cushion will form during operation, so that improved sliding of the chain on said oil cushion and a correspondingly high reduction of friction will be accomplished.

According to one variant, the angle may, in an advantageous manner, be in the range of from 2° to 10°, or, limited still further, in the range of 3° to 7°. This comparatively small angular range suffices to achieve the desired friction-reducing effect.

According to an embodiment, only inner link plates or outer link plates may have a trailing area of the link plate backs extending at an angle, and the link plate backs of the adjoining outer link plates or inner link plates may extend substantially parallel to the plane projected between the center lines of the associated pin openings and hinge openings, respectively. In this structural design, the usual sliding contact, in which the parallel link plate back slides along the rails, occurs between the outer link plates or inner link plates having a one-piece parallel link plate back and the rails. For reducing the friction, the adjoining outer link plates or inner link plates are, however, provided with a partially oblique link plate back. In this way, stability is maintained in the chain drive, which generally is operated in a highly dynamic manner, and reliable guidance by the guide rails and/or tensioning rails is ensured. As regards the vibration characteristics of the chain drive, the detachment and the stirring of the oil film below the trailing area of the slanted link plate back leads to an additional stimulation due to the upward and downward movement of the chain, which takes place perpendicular to the running direction. This additional minor vibration stimulation of the articulated chain leads, all in all, to an improvement in the NVH behavior of the chain drive in the internal combustion engine.

In addition, the adjoining link plate backs of adjacent inner and outer link plates may have a trailing area that extends at an angle and a leading area that extends substantially parallel. This allows the use of identical link plate shapes for the outer chain links and the inner chain links of the articulated chain. Furthermore, the up and down movements of the articulated chain and consequently also the additional stimulation in the chain drive will be rendered more uniform and accelerated. The heights of the inner and outer link plates are preferably equal in the leading area of the link plate back viewed in the running direction. Starting from this leading area, the height of the inner link plates then decreases in a direction opposite to the running direction. Here, at least in the leading areas, viewed in the running direction, of the link plate backs of the inner link plates and outer link plates, all straight portions of link plates lying parallel to one another are located on the same level, and together stabilize running of the chain along the rail in question.

According to a preferred embodiment, the outer and inner link plates may have an identical outer circumferential contour. With an identical outer circumferential contour, partially identical stamping tools can be used to manufacture both the inner and outer link plates. It should be noted in this context that the contour of the pin openings and of the link openings, respectively, does not count as part of the outer circumferential contour.

In this respect it is especially advantageous when the outer and inner link plates have outer circumferential contours that are mirror-inverted with respect to the plane projected between the center lines. This means that the link plates can also be installed rotated by 180° and that the link plate backs are identically shaped on both longitudinal sides in the running direction. Unless the link plates in question are toothed, such a chain could run on both its inner and outer sides along a rail in a friction-reduced manner.

To simplify the rotated assembly of the link plates in machine production of such chains, each link plate may accordingly have, above or below the projected plane, a projecting or recessed irregularity in the shape of the outer contour for sorting purposes, in addition to the slanted trailing area and the parallel leading area of the link plate back. This can be a notch or an indentation, that is sampled in a suitable manner and subsequently provides for the correct orientation.

According to a preferred embodiment, the inner chain link may comprise at least two inner link plates and two joint bushings, which interconnect said inner link plates and define the respective hinge openings, said joint bushings being arranged in a rotationally fixed manner in respective bushing openings of the associated inner link plates and the associated chain hinge pin of the associated outer chain link extending therethrough. For reducing the wear and the contact noise when the chain hinges engage the chain wheels of a chain drive, the joint bushings may have provided thereon additional rollers.

In addition, the present invention relates to a chain drive, in particular a timing chain drive of an internal combustion engine, comprising a driving chain wheel and at least one driven chain wheel, a toothless articulated chain according to one of the preceding claims, wrapped around the chain wheels, and at least one tensioning and/or guide rail in contact with the articulated chain.

The present invention additionally relates to the use of an articulated chain according to one of the preceding claims in a chain drive, in particular a timing chain drive of an internal combustion engine, wherein the two-part link plate back of the articulated chain wrapped around a driving chain wheel and at least one driven chain wheel is in contact with a tensioning and/or guide rail.

BRIEF DESCRIPTION OF THE DRAWINGS

In the following, embodiments of the present invention are explained in more detail making reference to drawings, in which.

DETAILED DESCRIPTION

Figure 1:
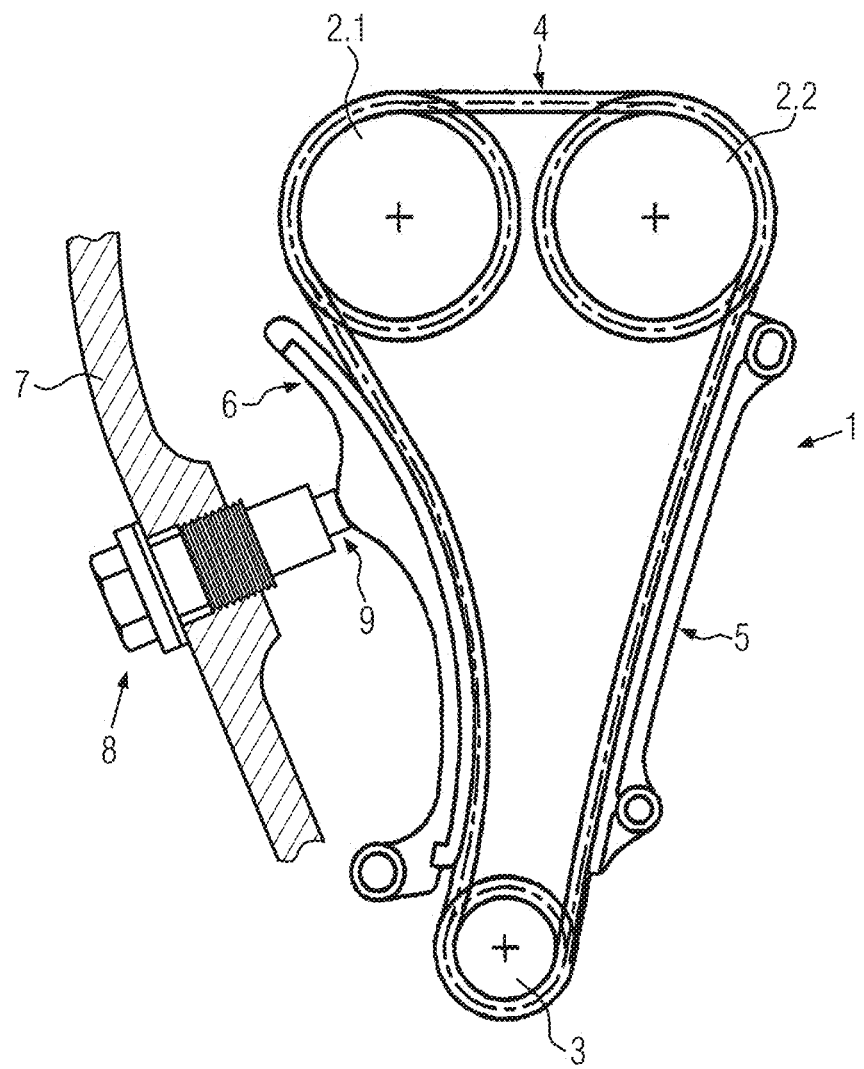
FIG. 1 shows a timing chain drive according to the present invention.
Figure 2:
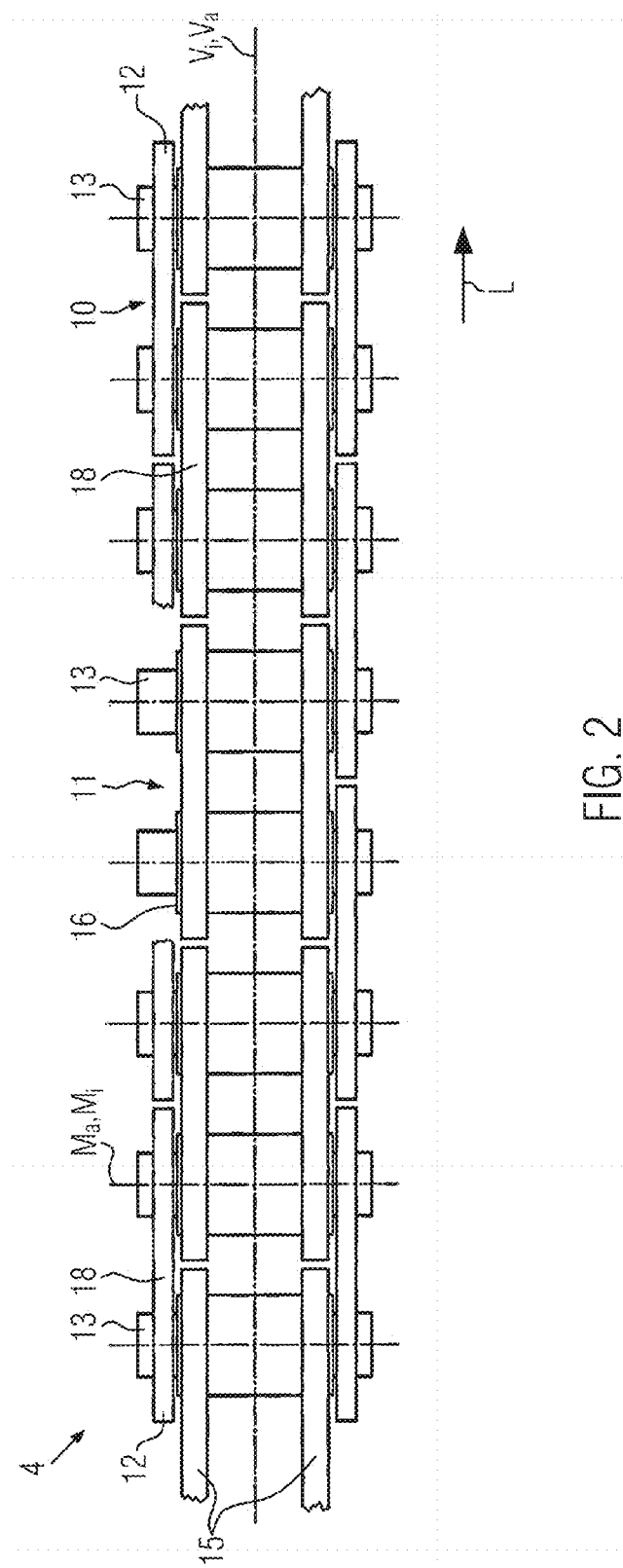
FIG. 2 shows a top view of a first embodiment of the articulated chain according to the present invention.
Figure 3:
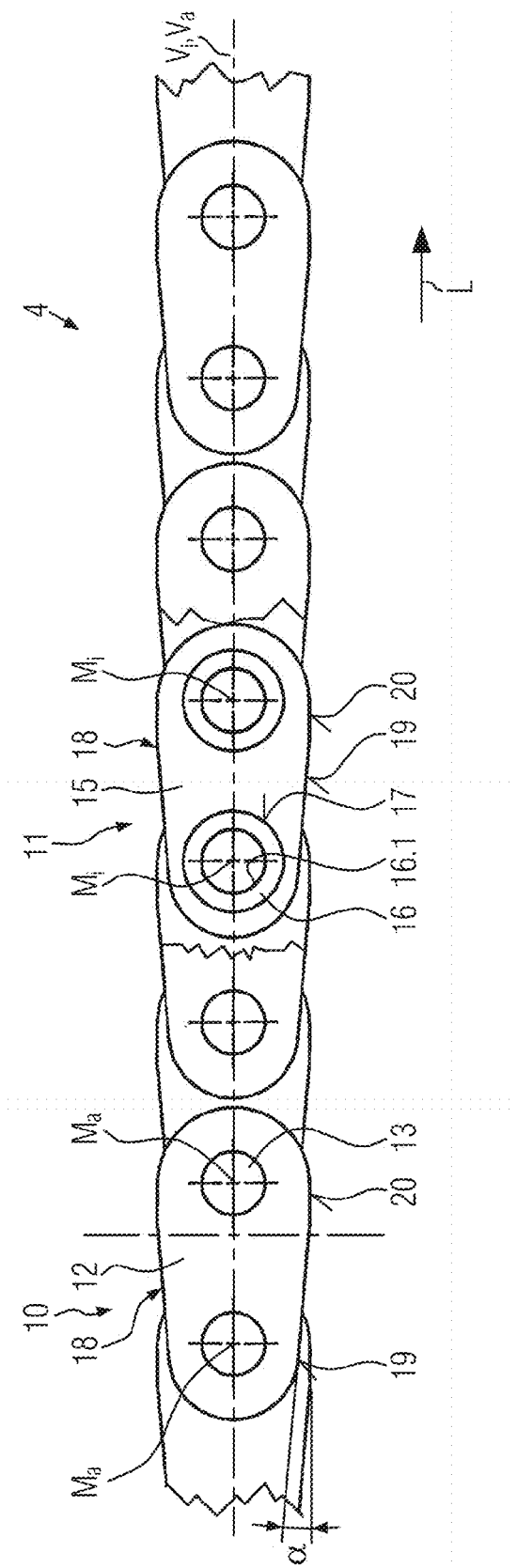
FIG. 3 shows a top view of the articulated chain according to FIG. 2.
Figure 5:
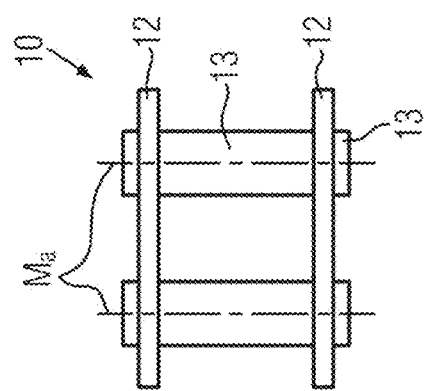
FIG. 5 shows a top view of an outer chain link of the articulated chain according to FIG. 2.
Figure 4:
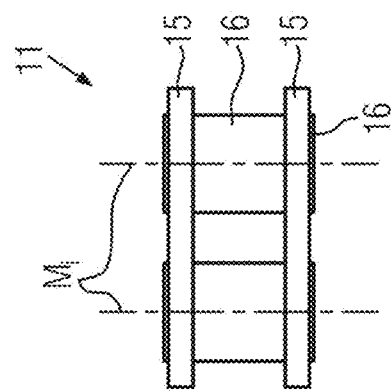
FIG. 4 shows a top view of an inner chain link of the articulated chain according to FIG. 2.

FIG. 1 shows a timing chain drive for an internal combustion engine. The timing chain drive 1 comprises two overhead camshaft chain wheels 2.1 and 2.2, a lower crankshaft chain wheel 3, an articulated timing chain 4 wrapped around these chain wheels, a guide rail 5 and a pivotably arranged tensioning rail 6 pressed against the timing chain 4 by means of a chain tensioner 8 screwed in position in the crankcase 7. The chain tensioner 8 is preferably connected to the engine oil hydraulic system so that its tensioning piston 9 is hydraulically pressed onto the pivotably arranged tensioning rail 6. Both the guide rail 5 and the tensioning rail 6 abut with their sliding covers on the link plate backs of the chain link plates 12, 15 of the timing chain 4 running therealong. This leads to friction losses, which are reduced through the structural design of the chain embodiments described hereinbelow.

The first embodiment of the timing chain 4 described with reference to FIGS. 2 to 5 comprises alternate outer chain links 10 and inner chain links 11 which are interconnected by means of a chain hinge. Each outer chain link 10 consists of two spaced-apart outer link plates 12 and two cylindrically shaped chain hinge pins 13 interconnecting these outer link plates 12. To this end, the chain hinge pins 13 are press-fitted into associated pin openings 14 in said outer link plates 12 such that they slightly project therebeyond. Each inner chain link 11 consists of two spaced-apart inner link plates 15 interconnected by means of two spaced-apart joint bushings 16. To this end, the joint bushings 16 are press-fitted into adequately shaped bushing openings 17 of the inner link plates 15. The joint bushings 16 are normally rolled from a sheet metal strip, so that a butt seam is formed, in the middle of which a lubricating opening is provided.

A hinge pin 13 of an outer chain link 10 and an associated joint bushing 16 of an inner chain link 11, through which this chain hinge pin 13 extends, define together a chain hinge. The inner side of the joint bushing 16 thus forms the hinge opening 16.1.

In the embodiment shown in FIGS. 2 to 5, the outer circumferential contours of the inner link plates 15 and of the outer link plates 12 are identical so that, when placed on top of one another with the correct orientation, their circumferences will be congruent. Only the thickness of the inner link plates 15 is slightly larger for reasons of stability, since for fixing the joint bushings 16 a bushing opening 17 that is larger than the pin opening 14 is required. Each outer link plate 12 and inner link plate 15 has in the outer contour thereof a two-part link plate back 18 on the upper side and on the lower side, with an area 20 constituting the leading area in the running direction L and a trailing area 19 following said leading area 20. The trailing area 19 extends at an angle α relative to the plane projected between the center lines $M_a$, $M_i$, of the pin openings 14 and of the hinge opening 16.1, respectively, the trailing area 19 extending beyond the center line $M_a$, $M_i$ delimiting the pitch, since the end face of the outer link plates 12 and inner link plates 15 constituting the rear end face in the running direction L has a smaller radius, so that the link plate back 18 extends beyond the actual pitch between the center lines $M_a$, $M_i$. The smaller leading area 20 of the link plate backs 18 extends parallel to the plane projected between the center lines $M_a$, $M_i$.

The plane $V_i$ projected between the center lines $M_i$ of the inner link plates divides the respective inner link plate 15 into a link plate area above the plane $V_i$ and a link plate area below the plane $V_i$, the link plate areas being here symmetric with respect to one another. The plane $V_i$ extends perpendicular to the plane of the drawing in FIGS. 2 to 5, so that both center lines $M_i$ lie in the plane $V_i$. The outer contour of the outer link plates 12 is identical to the inner link plates 15. Therefore, a plane Va projected between the center lines $M_a$ and the pin openings 14 divides the outer link plate 12 into a link plate area above the plane $V_a$ and a symmetric link plate area below the plane $V_a$.

Depending on the structural design of the chain drive 1, the link plate backs 18 of the outer link plates 12 and of the inner link plates 15 on the upper and/or lower side of the link plates 12, 15 come into contact with the guide rail 5 and the tensioning rail 6 of the timing chain drive 1. Especially the straight leading area 20 of the link plate backs 18 is in contact with the sliding surface of the guide rail 5 and/or tensioning rail 6, whereas, due to the slant of the link plate back 18 at an angle a that opens in a direction opposite to the running direction L, the trailing area 19 is increasingly separated from the sliding surface. In the embodiment shown, the angle is an angle of 5° (and lies thus in a range of 2° to 10°, preferably 3° to 7°). In an alternative embodiment, only the lower side of the outer link plates 12 has a trailing area 19 with an inclination having the angle α, whereas in the case of the inner link plates 15 only the upper side has a trailing area 19 inclined at an angle α. In the figures, the angle α is shown relative to the respective planes $V_i$ and $V_a$, starting from a parallel line that extends in the plane of the drawing.

The outer link plates 12 and the inner link plates 15 are installed such that the vertex of the angle α is oriented in the running direction L. The upper side of the outer link plates 12 and the respective associated upper side of the inner link plate 15 are only in the leading area 20 on the same parallel level, which extends above the center line $M_i$ of the trailing bushing opening 17 of the inner link plate 15 and of the leading pin opening 14 of the outer link plate 12 parallel thereto. Starting from this leading area 20 on the same level, the height or rather the distance between the adjoining trailing area 19 and the plane $V_i$ decreases due to the inclination at an angle a of said trailing area 19.

Due to the angle of the trailing area 19 of the two-part link plate back 18 of the outer link plate 12 and of the inner link plate 15, the oil film tears and is divided on the chain 4 as well as on the guide rail 5 or the tensioning rail 6 due to the increasing distance between the link plate back 18 and the guide rail 5 or the tensioning rail 6, and this, in turn, will lead to stirring of the oil film. The stirred oil film causes slight floating of the timing chain 4 and thus also improved sliding characteristics. This leads to another increase in the friction reducing effect, in addition to the effect produced by the smaller friction surface of the leading area 20 of the link plate back 18.

In the present case, an identical outer contour is used for all the link plates 12, 15 for reasons of cost. This, however, is not absolutely necessary as long as on the side of the chain 4 which is intended to slide along the guide rail 5 or the tensioning rail 6 at least some of the link plates 12, 15 have an adequately configured two-part link plate back 18 with a slanted trailing area 19. On the sides which do not slide along the guide rails 5 or tensioning rails 6, all the link plates 12, 15 may have a continuously straight link plate back 18, said link plate backs 18 being preferably on the same level when the chain 4 is running straight.

Figure 6:
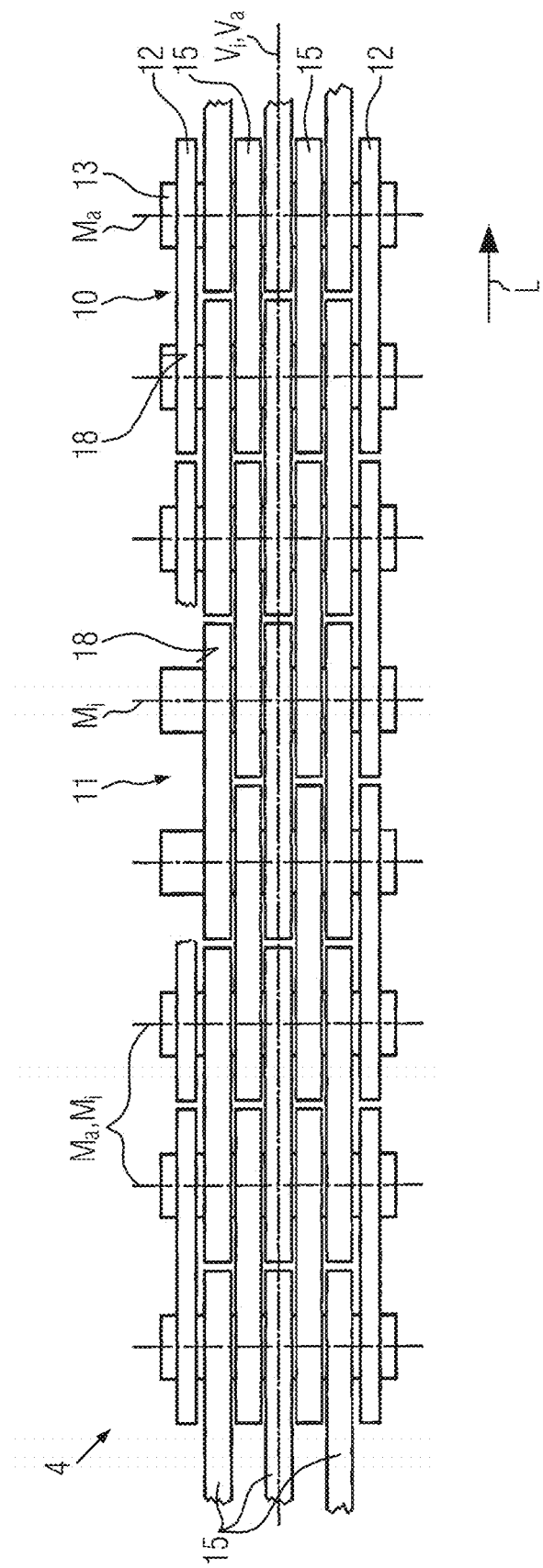
FIG. 6 shows a top view of a second embodiment of the articulated chain according to the present invention.
Figure 7:
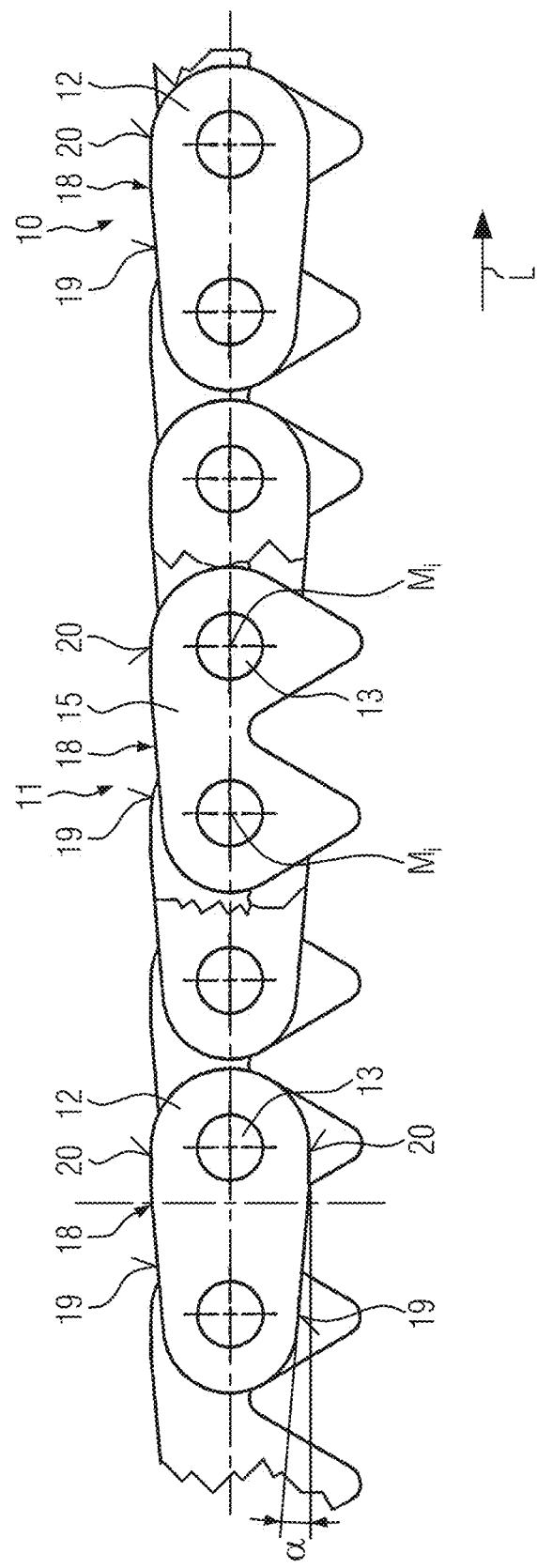
FIG. 7 shows a side view of the articulated chain according to FIG. 6.

As shown in FIGS. 6 and 7, the invention can also be used for tooth chains. As far as tooth chains are concerned, it is in any case predetermined from the start which side of the link plates 12, 15 is intended to functionally cooperate with the chain wheels 2, 3 and which side is intended to functionally cooperate with the guide and tensioning rails 5, 6. In the following, only the essential differences between this tooth chain embodiment and the preceding embodiment will be discussed. As regards elements having the same structural design and producing the same effect, the above description will additionally be referred to making use of the same reference numerals. As can be seen in FIG. 7, only the outer link plates 12 of the outer chain links 10 of this tooth chain have a symmetric structural design comprising respectively a two-part link plate back 18, the respective two-part link plate backs 18 comprising a trailing area 19, which is inclined at an angle $\alpha$ relative to the plane $V_a$, and a leading parallel area 20 that extends parallel to the plane $V_a$. The inner link plates 15 of the inner chain links 11 and the intermediate inner link plates 15 of the outer chain links 10, however, have only on the upper side thereof a two-part link plate back 18 with an inclined trailing area 19, whereas teeth for engagement with the chain wheels 2, 3 are formed on the lower side thereof. As can be seen in FIG. 6, the tooth chain is composed of link plate packages, the inner link plates 15 of the inner chain links 11 and the outer link plates 12 following one another in alternate succession.

Figure 8:
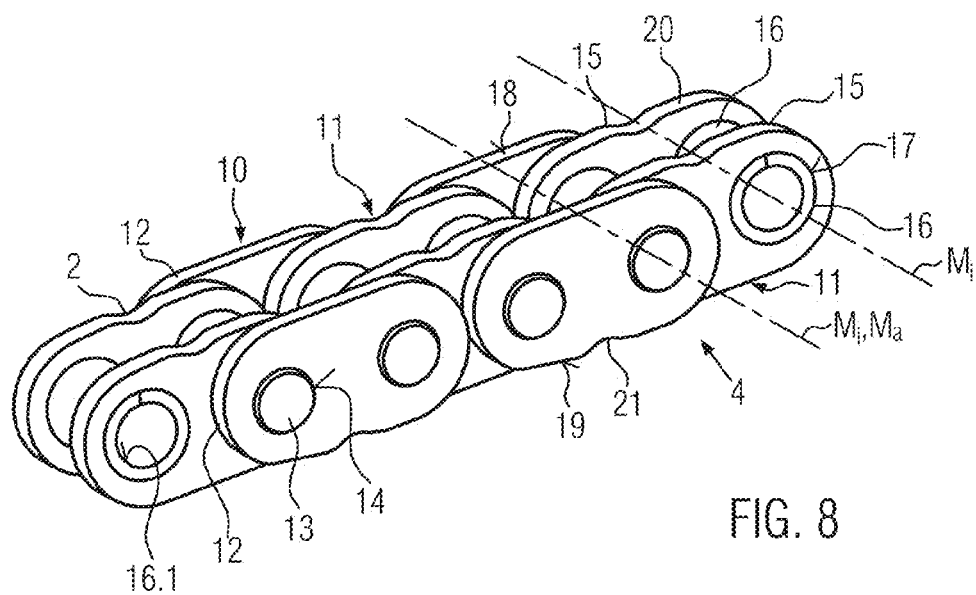
FIG. 8 shows a perspective view of a third embodiment of the articulated chain according to the present invention.
Figure 9:
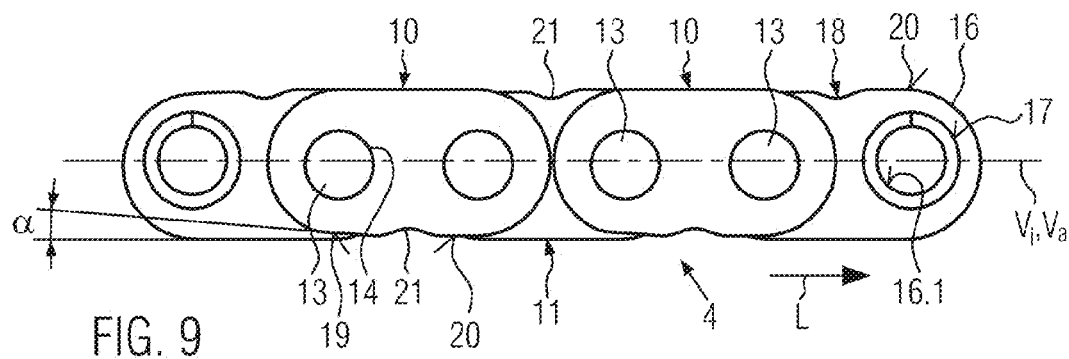
FIG. 9 shows a side view of the articulated chain according to FIG. 8.

In the following, a further embodiment of the present invention will be explained in more detail making reference to FIGS. 8 and 9. Only the essential differences from the preceding embodiment will be discussed hereinbelow, for which reason supplementary reference will be made to the above description, with the same reference numerals being used for elements having the same structural design or producing the same effect.

In the depicted embodiment of an articulated chain 4, the two-part link plate backs 18 of the inner link plates 15 are arranged on the upper side, whereas the two-part link plate backs 18 of the outer link plates 12 are arranged on the lower side. Nevertheless, the outer circumferential contours of the inner link plates 15 and of the outer link plates 12 are identical so that, when these link plates have the same orientation and are placed on top of one another in the right way, their circumferences will be congruent. The two-part link plate backs 18 of the outer link plates 12 and of the inner link plates 15 include between the inclined trailing areas 19 and the parallel leading areas 20 an irregularity in the shape of the outer contour, said irregularity having the form of a rounded sorting notch 21. During assembly, this sorting notch 21 helps in assembling the respective link plates 12, 15 in the correct orientation.

The essential difference of this embodiment is to be seen in that the slant of the trailing area 19 by the angle $\alpha$ has a sorting notch 21 at the transition to the leading area 20. In the present case, the slant extends from the area of the respective associated link plate constituting the trailing area 19 in the running direction L up to the notch 21, whereas the area constituting the leading area 20, when seen in the running direction L, extends straight (parallel to the planes $V_i$ and $V_a$, respectively). In the embodiment shown it is therefore the slant at an angle $\alpha$ in the trailing area 19 of the upper side and in the case of the outer link plate 12 it is the trailing (when seen in the running direction L) area 19 of the lower side which is configured such that it is inclined at the angle $\alpha$, whereas the respective leading area 20 is configured as a straight area (parallel to the planes $V_i$ and $V_a$, respectively). In this embodiment, the notch 21 can also exert an increased influence on the lubricating effect, since intensified stirring can here take place at the end of the leading area 20 at the transition to the trailing area 19.

The upper side of the outer link plates 12 defines a parallel link plate back, which comes substantially in full-area contact with the tensioning rail 6 or the guide rail 5. As regards the inner link plates 15 it is, due to the slant of the trailing area 19, only the leading area 20 above the opening constituting the forward hinge opening 16.1, when viewed in the running direction L, that comes into contact with the tensioning rail 6 or the guide rail 5. On the lower side of the chain shown is FIGS. 8 and 9, the lower side of the inner link plates 15 is configured as a parallel link plate back (between the center lines $M_i$ of the associated opening 16.1), so that large-area contact with a rail can here take place. The two-part link plate backs 18 on the lower side of the outer link plates 12 are configured accordingly and only come into contact with the respective rail in the leading area 20 viewed in the running direction L above the forward pin opening 14. This structural design has the effect that the direction of closure of the chain determines whether primarily the straight link plate backs of the inner chain links 11 or of the outer chain links 10 come into contact with the rails 5, 6. As a general rule, however, it is preferred for the straight link plate backs of the outer link plates 12 to come into contact with the rails. According to one variant, also all the upper sides of the inner and outer chain links may be provided with an oblique trailing area 19.

The invention claimed is:

1. A drive chain having alternating inner and outer chain links connected to one another by means of a chain hinge, and having a predetermined running direction, each inner chain link comprising at least one inner link plate and each outer chain link comprising at least two outer link plates and two chain hinge pins interconnecting the same, each chain hinge pin being arranged in a rotationally fixed manner in a pin opening of the associated outer link plates and extending through a hinge opening of the associated inner chain link so as to form a chain hinge, and at least one of the inner and outer chain links having link plate backs that are adapted to be brought into contact with a tensioning rail or a guide rail, wherein the link plate backs have in the running direction a leading area and an adjoining trailing area, the leading area of the link plate backs extending substantially parallel to a plane projected between the center lines of the pin openings and hinge openings, respectively, and the trailing area of the link plate backs extending at a straight slant on at least from one of the inner and outer link plates at an angle to the plane projected between the center lines, wherein a vertex of the angle points to the running direction, the trailing area extends beyond one of the center lines and passes into an adjacent arcuated rear end face of said one of the inner and outer link plates.

2. The drive chain according to claim 1, wherein the trailing area of the link plate backs, which extends at the angle, extends over a distance determined in the running direction, said distance corresponding to 50% to 90% of a pitch of the center lines of the pin openings and of the hinge openings, respectively.

3. The drive chain according to claim 1, wherein the angle is in the range of from 2° to 10°.

4. The drive chain according to claim 3, wherein the angle is in the range of from 3° to 7°.

5. The drive chain according to claim 1, wherein only inner link plates or outer link plates have the trailing area of the link plate backs extending at the angle, and the link plate backs of the adjoining outer link plates or inner link plates extend substantially parallel to the plane projected between the center lines of the associated pin openings.

6. The drive chain according to claim 1, wherein the adjoining link plate backs of adjacent inner and outer link plates have the trailing area that extends at the angle and a leading area that extends substantially parallel.

7. The drive chain according to claim 1, wherein the outer and inner link plates have identical outer circumferential contours.

8. The drive chain according to claim 1, wherein the outer and inner link plates have outer circumferential contours that are mirror-inverted with respect to the plane projected between the center lines.

9. The drive chain according to claim 1, wherein the inner chain link comprises at least two inner link plates and two joint bushings, which interconnect said inner link plates and define the respective hinge openings, said joint bushings being arranged in a rotationally fixed manner in respective bushing openings of the associated inner link plates and the associated chain hinge pin of the associated outer chain link extending therethrough.

10. A timing chain drive of an internal combustion engine, comprising a driving chain wheel and at least one driven chain wheel, a drive chain wrapped around the chain wheels, and at least one of a tensioning rail and a guide rail in contact with the drive chain,
   wherein the drive chain has a predetermined running direction and alternating inner and outer chain links connected to one another by means of a chain hinge, at least one of the inner and outer chain links having link plate backs that are adapted to be brought into contact with said tensioning rail or guide rail,
   wherein the link plate backs have in the running direction a leading area and an adjoining trailing area, the leading area of the link plate backs extending substantially parallel to a plane projected between center lines of respective hinge openings and the trailing area of the link plate backs extending at a straight slant on at least from one of the inner and outer link plates at an angle to the plane projected between the center lines, and
   wherein a vertex of the angle points to the running direction, the trailing area extends beyond one of the center lines and passes into an adjacent arcuated rear end face of said one of the inner and outer link plates.

11. A use of a drive chain in a timing chain drive of an internal combustion engine, wherein a link plate back of the drive chain wrapped around a driving chain wheel is in contact with at least one of a tensioning rail and a guide rail,
   wherein the drive chain has a predetermined running direction and alternating inner and outer chain links connected to one another by means of a chain hinge, at least one of the inner and outer chain links having link plate backs that are adapted to be brought into contact with said tensioning rail or guide rail,
   wherein the link plate backs have in the running direction a leading area and an adjoining trailing area, the leading area of the link plate backs extending substantially parallel to a plane projected between center lines of respective hinge openings and the trailing area of the link plate backs extending at a straight slant on at least from one of the inner and outer link plates at an angle to the plane projected between the center lines, and
   wherein a vertex of the angle points to the running direction, the trailing area extends beyond one of the center lines and passes into an adjacent arcuated rear end face of said one of the inner and outer link plates.

* * * * *